(12) United States Patent
Nibir et al.

(10) Patent No.: US 12,671,256 B2
(45) Date of Patent: Jun. 30, 2026

(54) DYNAMIC LOAD SUPPORT IN HYBRID POWER BUCK-BOOST (HPBB) BATTERY CHARGER USING FORCED CONTINUOUS CONDUCTION MODE (FCCM)

(71) Applicant: Renesas Electronics America Inc., Milpitas, CA (US)

(72) Inventors: Shahriar Jalal Nibir, Apex, NC (US); Sungkeun Lim, Apex, NC (US); Yen-Mo Chen, Morrisville, NC (US); Chong Han, Cary, NC (US); Heonyoung Kim, Cary, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 768 days.

(21) Appl. No.: 18/188,672

(22) Filed: Mar. 23, 2023

(65) Prior Publication Data

US 2024/0322590 A1 Sep. 26, 2024

(51) Int. Cl.
*H02J 7/02* (2016.01)
*H02M 1/42* (2007.01)

(52) U.S. Cl.
CPC .............. *H02J 7/02* (2013.01); *H02J 2207/20* (2020.01); *H02J 2207/30* (2020.01); *H02M 1/4225* (2013.01); *H02M 1/4291* (2021.05)

(58) Field of Classification Search
CPC ...... H02J 7/02; H02J 2207/20; H02J 2207/30; H02M 1/4225; H02M 1/4291; H02M 1/0058

USPC ......................................... 320/140, 141, 145
See application file for complete search history.

(56) References Cited

U.S. PATENT DOCUMENTS

| | | | | |
|---|---|---|---|---|
| 7,863,865 B2* | 1/2011 | Hussain | .................. | H02J 7/927 |
| | | | | 320/140 |
| 10,778,099 B1* | 9/2020 | Womac | .................. | H02M 3/158 |
| 2012/0169126 A1* | 7/2012 | Totterman | ........... | H02M 3/1582 |
| | | | | 323/283 |
| 2014/0203761 A1* | 7/2014 | Paparrizos | ................ | H02J 7/02 |
| | | | | 320/107 |
| 2023/0361689 A1* | 11/2023 | Khamesra | ............... | H02M 1/08 |

* cited by examiner

*Primary Examiner* — Richard V Muralidar
(74) *Attorney, Agent, or Firm* — SCULLY, SCOTT, MURPHY & PRESSER, P.C.

(57) ABSTRACT

A method may include receiving power from a power adapter having a power adapter current limit, providing power from the power adapter to a load having a load current at a first load current level that is less than or equal to the power adapter current limit; generating a first periodic current through an inductor in a forward direction; detecting the load having the load current at a second load current level that may be greater than the adapter power current limit; decreasing the forward current level of the first periodic current; and generating a second periodic current through the inductor in a reverse direction to provide power from the battery module to the load. The second periodic current may be initiated in the reverse direction when the first periodic current in the forward direction reaches the zero current level.

20 Claims, 4 Drawing Sheets

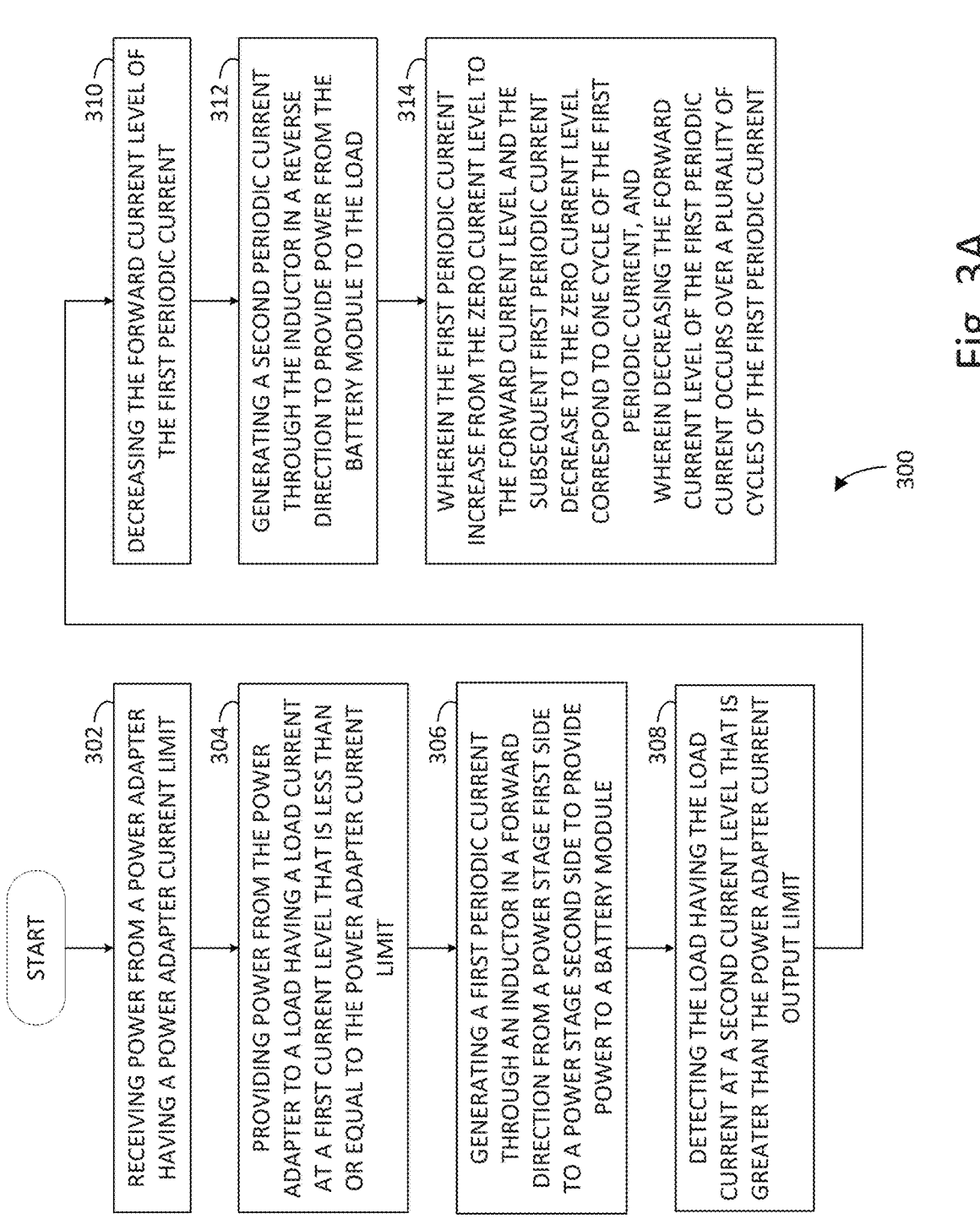

START

302
RECEIVING POWER FROM A POWER ADAPTER HAVING A POWER ADAPTER CURRENT LIMIT

304
PROVIDING POWER FROM THE POWER ADAPTER TO A LOAD HAVING A LOAD CURRENT AT A FIRST CURRENT LEVEL THAT IS LESS THAN OR EQUAL TO THE POWER ADAPTER CURRENT LIMIT

306
GENERATING A FIRST PERIODIC CURRENT THROUGH AN INDUCTOR IN A FORWARD DIRECTION FROM A POWER STAGE FIRST SIDE TO A POWER STAGE SECOND SIDE TO PROVIDE POWER TO A BATTERY MODULE

308
DETECTING THE LOAD HAVING THE LOAD CURRENT AT A SECOND CURRENT LEVEL THAT IS GREATER THAN THE POWER ADAPTER CURRENT OUTPUT LIMIT

310
DECREASING THE FORWARD CURRENT LEVEL OF THE FIRST PERIODIC CURRENT

312
GENERATING A SECOND PERIODIC CURRENT THROUGH THE INDUCTOR IN A REVERSE DIRECTION TO PROVIDE POWER FROM THE BATTERY MODULE TO THE LOAD

314
WHEREIN THE FIRST PERIODIC CURRENT INCREASE FROM THE ZERO CURRENT LEVEL TO THE FORWARD CURRENT LEVEL AND THE SUBSEQUENT FIRST PERIODIC CURRENT DECREASE TO THE ZERO CURRENT LEVEL CORRESPOND TO ONE CYCLE OF THE FIRST PERIODIC CURRENT, AND WHEREIN DECREASING THE FORWARD CURRENT LEVEL OF THE FIRST PERIODIC CURRENT OCCURS OVER A PLURALITY OF CYCLES OF THE FIRST PERIODIC CURRENT

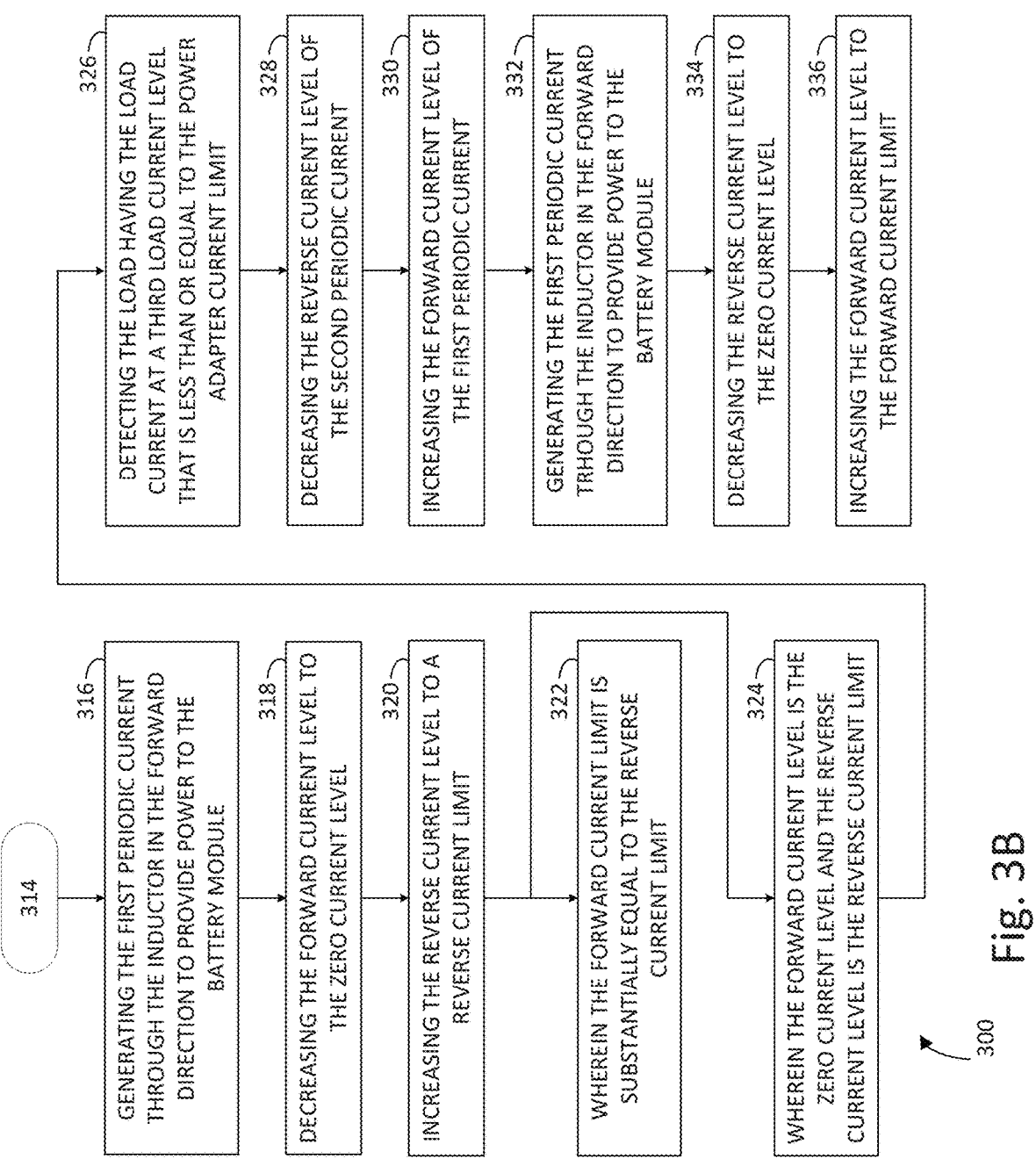

314

316 — GENERATING THE FIRST PERIODIC CURRENT THROUGH THE INDUCTOR IN THE FORWARD DIRECTION TO PROVIDE POWER TO THE BATTERY MODULE

318 — DECREASING THE FORWARD CURRENT LEVEL TO THE ZERO CURRENT LEVEL

320 — INCREASING THE REVERSE CURRENT LEVEL TO A REVERSE CURRENT LIMIT

322 — WHEREIN THE FORWARD CURRENT LIMIT IS SUBSTANTIALLY EQUAL TO THE REVERSE CURRENT LIMIT

324 — WHEREIN THE FORWARD CURRENT LEVEL IS THE ZERO CURRENT LEVEL AND THE REVERSE CURRENT LEVEL IS THE REVERSE CURRENT LIMIT

326 — DETECTING THE LOAD HAVING THE LOAD CURRENT AT A THIRD LOAD CURRENT LEVEL THAT IS LESS THAN OR EQUAL TO THE POWER ADAPTER CURRENT LIMIT

328 — DECREASING THE REVERSE CURRENT LEVEL OF THE SECOND PERIODIC CURRENT

330 — INCREASING THE FORWARD CURRENT LEVEL OF THE FIRST PERIODIC CURRENT

332 — GENERATING THE FIRST PERIODIC CURRENT THROUGH THE INDUCTOR IN THE FORWARD DIRECTION TO PROVIDE POWER TO THE BATTERY MODULE

334 — DECREASING THE REVERSE CURRENT LEVEL TO THE ZERO CURRENT LEVEL

336 — INCREASING THE FORWARD CURRENT LEVEL TO THE FORWARD CURRENT LIMIT

DYNAMIC LOAD SUPPORT IN HYBRID POWER BUCK-BOOST (HPBB) BATTERY CHARGER USING FORCED CONTINUOUS CONDUCTION MODE (FCCM)

BACKGROUND

Unless otherwise indicated herein, the materials described in this section are not prior art to the claims in this application and are not admitted to be prior art by inclusion in this section. The present disclosure relates in general to systems and methods of controlling semiconductor devices, more particularly, to control of a battery charger.

A battery charger may be connected between a power supply and a load, such as a laptop computer or other consumer electronic device. In some cases, the battery charger may moderate and supplement power provided to the laptop under certain conditions. The battery charger usually includes a battery module configured to store and retrieve power when the power demand (e.g., current demand) from the laptop may temporarily exceed the limits of the power supply. Initially, the battery charger may be in a forward mode to charge the batteries while also having sufficient power to supply the laptop. As used herein, the phrase forward mode refers to the direction of power flow into the battery module (e.g., batteries charging), and the phrase reverse mode refers to the direction of power flow out from the battery module (e.g., batteries discharging).

When a power demand of the laptop increases and exceeds the capability of the power supply, supplemental power from the battery module in the battery charger may be needed. However, to provide power from the battery module to the load traditionally requires "turning around" the battery charger from the forward mode to the reverse mode. In a turn-around scenario, the battery charger may enter an intermediate mode for a period of time (e.g., a latency period) where the battery module is neither charging nor discharging, sometimes described as a discontinuous conduction mode (DCM). For safety and efficiency reasons, it can take a considerable amount of time for a battery charger to transition from forward mode to reverse mode. Traditionally, simply providing power from the battery module to a load without completing this turn around latency may result in heating of components and damage to the battery charger. Also, this turn around latency can cause undesirable effects for the laptop and could result in a system reset if the latency is too long. For example, if a laptop connected to the battery charger starts a software program that suddenly requires a large amount of power, or if the laptop battery is depleted prior to starting the software program, the increased power demand or insufficient power supplied to the laptop input during such a turn around latency period for the battery charger may result in the laptop "timing out" and/or initiating a system reset which can interrupt laptop user activities. What is needed is a solution that addresses these problems, and others.

SUMMARY

According to one example, a method for controlling a battery charger is generally described. The method may include receiving power from a power adapter having a power adapter current limit and connected to a battery charger input, the battery charger may include a power stage having a power stage first side connected to the battery charger input through an input current sensor, the power stage first side may be connected to a battery charger output and configured to be connected to a load, the power stage may have a power stage second side configured to be connected to a battery module, the power stage second side may be isolated from the battery charger output, the power stage may have an inductor connected between the power stage first side and the power stage second side. The method may include providing power from the power adapter to the load having a load current at a first load current level that is less than or equal to the power adapter current limit; generating, by a charger controller, a first periodic current through the inductor in a forward direction from the power stage first side to the power stage second side to provide power to the battery module, the first periodic current configured to increase from a zero current level to a forward current level may be a forward current limit and may subsequently decrease to the zero current level in a triangular waveform, the battery charger may be operated in a forward continuous conduction mode. The method may include detecting, by the input current sensor, the load having the load current at a second load current level that may be greater than the adapter power current limit; decreasing, by the charger controller, the forward current level of the first periodic current; and generating, by the charger controller, a second periodic current through the inductor in a reverse direction from the power stage second side to the power stage first side to provide power from the battery module to the power stage first side, the second periodic current may be configured to increase from the zero current level to a reverse current level and may subsequently decrease to zero current level in a triangular waveform, the second periodic current may be initiated in the reverse direction when the first periodic current in the forward direction reaches the zero current level, the battery charger may be operated in a forced continuous conduction mode, the inductor current may be changed from the forward direction to the reverse direction continuously.

According to this example, an increase in the first periodic current from the zero current level to the forward current level and a subsequent decrease in the first periodic current to the zero current level may correspond to one cycle of the first periodic current, and decreasing the forward current level of the first periodic current may occur over a plurality of cycles of the first periodic current. While the forward current limit is greater than the zero current level and subsequent to generating the second periodic current, the method may further include generating, by the charger controller, the first periodic current through the inductor in the forward direction from the power stage first side to the power stage second side to provide power to the battery module, the first periodic current may be configured to increase from the zero current level to the forward current level and may subsequently decrease to the zero current level, the first periodic current may be initiated in the forward direction when the second periodic current reaches the zero current level. The method may further include decreasing the forward current level to the zero current level. The method may further include increasing the reverse current level to a reverse current limit. The forward current limit may be substantially equal to the reverse current limit. The forward current level may be the zero current level and the reverse current level may be the reverse current limit, wherein the battery charger may be operated in a reverse continuous conduction mode. The method may further include detecting, by the input current sensor, the load may have the load current at a third load current level that is less than or equal to the power adapter current limit; decreasing, by the charger controller, the reverse current level of the second periodic current; increasing, by the charger controller, the forward current level of the first periodic current; and generating, by the charger controller, the first periodic current through the inductor in the forward direction may provide power to the battery module, the first periodic current may be initiated in the forward direction when the second periodic current in the reverse direction reaches the zero current level, the battery charger may be operated in the forced continuous conduction mode. The inductor current may be changed from the reverse direction to the forward direction continuously. The method may further include decreasing the reverse current level to the zero current level; and increasing the forward current level to the forward current limit, the battery charger may be operated in the forward continuous conduction mode.

According to another example, an electronic apparatus may include an input current sensor configured to detect a load current from a load configured to consume electrical power, the input current sensor may be configured to receive power from a power adapter having a power adapter current limit; a battery module may be configured to store and retrieve electrical power in one or more battery cells; and a battery charger may include a charger controller coupled to a power stage having a power stage first side and a power stage second side, the power stage first side may include a first pair of switching elements (Q1,Q2) connected in a series arrangement and coupled to the power adapter through the input current sensor and through a battery charger input, the power stage second side may include a second pair of switching elements (Q3,Q4) connected together in a series arrangement and coupled to the battery module, the first pair of switching elements and the second pair of switching elements may be coupled together through an inductor in a buck-boost converter arrangement, the load may be connected through a battery charger output to the power stage first side and may be isolated from the power stage second side. The charger controller may be configured to control the first pair of switching elements and the second pair of switching elements to alternately generate an inductor current comprising a first periodic current in a forward direction through the inductor to charge the battery module and generate a second periodic current in a reverse direction through the inductor to supplement power from the power adapter to the load with power stored in the battery module when the load current is greater than the power adapter current limit. The inductor current may be changed from the forward direction to the reverse direction continuously.

According to this example, the electronic apparatus may include a bypass module, the load may be connected through the bypass module to the power stage first side. The apparatus may include an isolation module, the load may be isolated from the power stage second side by the isolation module. The apparatus may include a battery current sensor, the battery module may be connected through the battery current sensor to the power stage second side. The charger controller may be configured to continuously transition the inductor current from at least one of a forward continuous conduction mode to a reverse continuous conduction mode and the reverse continuous conduction mode to the forward continuous conduction mode by entering a forced continuous conduction mode.

According to yet another example, an electronic system is generally described. An electronic system may include a power adapter configured to provide electrical power, the power adapter may have a power adapter current limit; a load configured to consume electrical power, the load may have a load current; an input current sensor may be configured to detect the load current; a battery module may be configured to store and retrieve electrical power in one or more battery cells; and a battery charger may include a charger controller coupled to a power stage having a power stage first side and a power stage second side, the power stage first side may include a first pair of switching elements (Q1,Q2) connected in a series arrangement and coupled to the power adapter through the input current sensor and through a battery charger input, the power stage second side may include a second pair of switching elements (Q3,Q4) connected together in a series arrangement and coupled to the battery module, the first pair of switching elements and the second pair of switching elements may be coupled together through an inductor in a buck-boost converter arrangement, the load may be connected through a battery charger output to the power stage first side and isolated from the power stage second side, wherein the charger controller may be configured to control the first pair of switching elements and the second pair of switching elements to alternately generate an inductor current that may include a first periodic current in a forward direction through the inductor to charge the battery module and a second periodic current in a reverse direction through the inductor to supplement power from the power adapter to the load with power stored in the battery module when the load current may be greater than the power adapter current limit. The inductor current may be changed from the forward direction to the reverse direction continuously.

According to this example, the power adapter may be one of an AC/DC wall adapter and a USB port. The system may further include a bypass module, the load may be connected through the bypass module to the power stage first side. The system may further include an isolation module, the load may be isolated from the power stage second side by the isolation module. The system may further include a battery current sensor, the battery module may be connected through the battery current sensor to the power stage second side. The charger controller may be configured to continuously transition the inductor current from at least one of a forward continuous conduction mode to a reverse continuous conduction mode and the reverse continuous conduction mode to the forward continuous conduction mode by entering a forced continuous conduction mode.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 3A and FIG. 3B are a flow diagram illustrating a method for operating a battery charger, in accordance with various examples.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

To be described in more detail below, dynamic load support using a battery charger in forced continuous conduction mode (Forced CCM) can be implemented by a system and method described in accordance with the present disclosure. The system can supply power with lower latency and at lower cost. The described solution recognizes the disruptions that may be caused by latency by immediately providing supplemental power by changing current flow from forward to reverse (e.g., from positive to negative) continuously, while maintaining a desirable triangular or "mountain-shaped" voltage waveform when load demand is high in various applications. Thus, the described solution addresses these and other issues and provides an electronic system that can implement dynamic load support using a battery charger in forced continuous conduction mode. Moreover, the system and method can provide an efficient voltage regulation technique for use with various consumer electronic devices.

Figure 1:
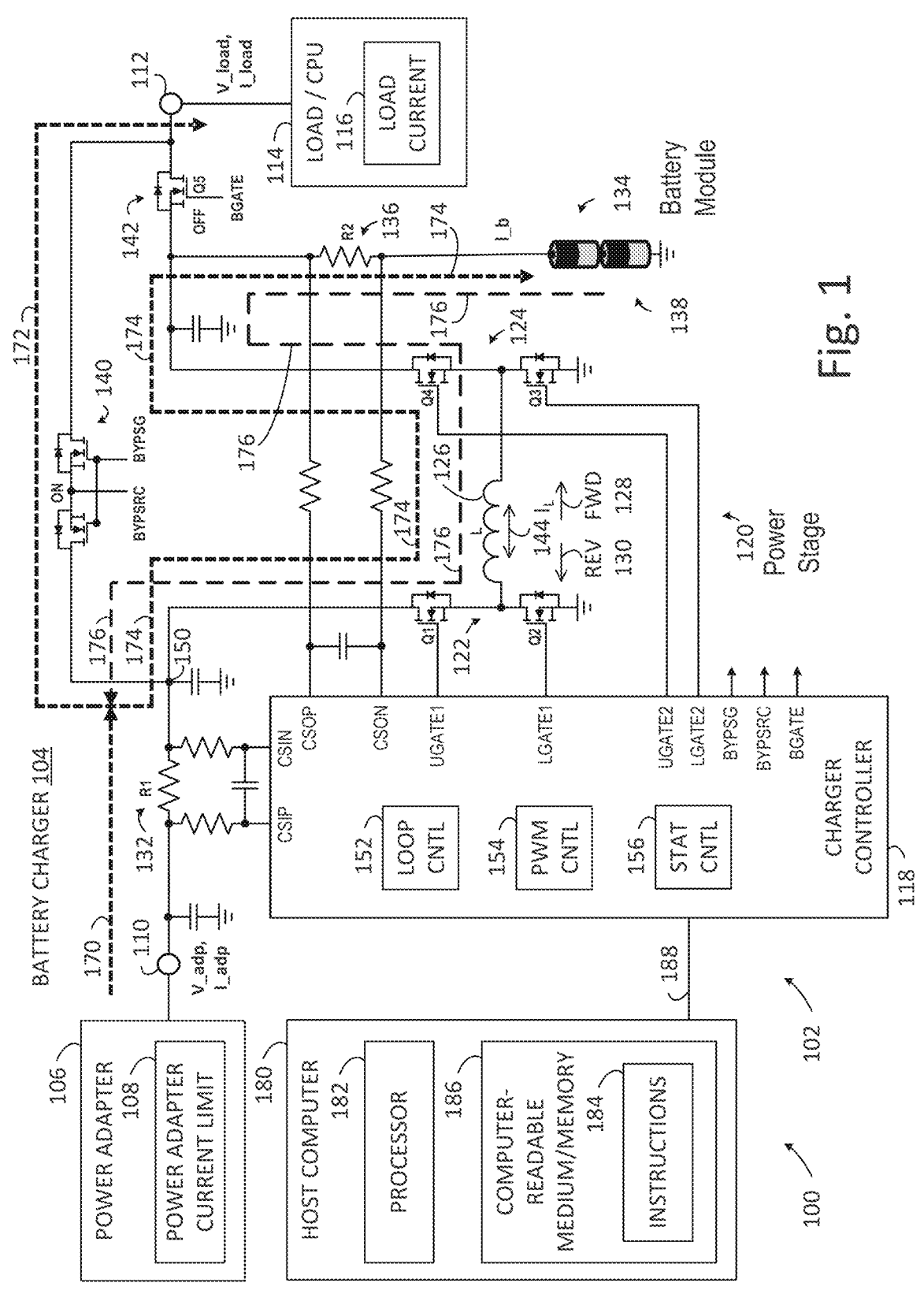
FIG. 1 illustrates an example of an electronic system that can implement dynamic load support using a battery charger in a forced continuous conduction mode (Forced CCM), in accordance with various examples of the present disclosure.

FIG. 1 illustrates an example of an electronic system that can implement dynamic load support using a battery charger in a forced continuous conduction mode (Forced CCM), in accordance with various examples of the present disclosure. Electronic system 100 may include two or more electronic devices or components. Electronic system 100 may be implemented generally as an electronic system 100 (e.g., a semiconductor system) that may include an electronic apparatus 102 which may be implemented generally as a semiconductor apparatus 102 along with one or more semiconductor circuits, semiconductor chips, memory elements, discrete components, and the like.

According to an example, electronic system 100 may include a battery charger 104 along with other components. Electronic system 100 may include a power adapter 106 configured to provide electrical power to a battery charger input 110 of battery charger 104. For example, power adapter 106 may be an AC/DC wall adapter power supply (e.g., for connection to a domestic power source) or may be a USB (Universal Serial Bus) port located in wall adapter, a computer device, or the like. Power adapter 106 may have a power adapter current limit 108 corresponding to a maximum current delivery capability of power adapter 106. Battery charger 104 may have a battery charger output 112 configured to provide power from battery charger 104 to a load 114 which may have an instantaneous load current 116 corresponding to an amount of power needed by load 114 at any time. In this manner, battery charger 104 may be connected between power supply 106 and load 114. System 100 may include an input current sensor 132 (e.g., a first current sensor) configured to detect load current 116. System 100 may also include a battery module 134 configured to store and retrieve electrical power in one or more battery cells 138. Battery module 134 may include one battery cell, two battery cells, or four battery cells, and the like, arranged in a series, parallel, or series-parallel arrangement.

Battery charger 104 may include a charger controller 118 configured to control battery charger 104. Charger controller 118 may be operatively connected to a power stage 120 having four switching elements (e.g., transistors or devices) arranged in pairs. Power stage 120 may have a power stage first side 122 including two switching elements (Q1, Q2) connected in a series arrangement and coupled to power adapter 106 through input current sensor 132 and through a battery charger input 110. Power stage 120 may have a power stage second side 124 including two switching elements (Q3, Q4) connected in a series arrangement and coupled to battery module 134. The switching elements (e.g., transistors) may include enhancement mode, n-type (e.g., n-channel) metal oxide semiconductor field effect transistors (MOSFETs) as switching elements. Power stage 120 may include an inductor 126 configured to connect power stage first side 122 with power stage second side 124 in a buck-boost arrangement. In this manner, current may be passed through inductor 126 in a forward direction 128 (FWD) for charging battery module 134 or current may be passed through inductor 126 in a reverse direction 130 (REV), opposite forward direction 128, to discharge battery module 134. Load 114 may be connected through battery charger output 112 to power stage first side 122 and isolated from the power stage second side 124.

Battery charger 104 may include a bypass module 140, wherein load 114 may be connected through bypass module 140 to power stage first side 122 and through input current sensor 132 to battery charger input 110 and power adapter 106. Bypass module 140 may include dual enhancement mode n-channel MOSFET transistors arranged in a back-to-back manner (e.g., a common-source configuration to prevent reverse current flow) and enabled by charger controller 118 to allow power flow from power stage first side 122 to load 114 when bypass module is enabled. Alternatively, bypass module 140 may prevent power flow from power stage first side 122 to load 114 when bypass module is disabled in various modes.

Battery charger 104 may include an isolation module 142 configured to isolate load 114 from power stage second side 124 and prevent power flow from power stage second side 124 to load 114 when isolation module 142 is disabled. Isolation module 142 may include an enhancement mode n-channel MOSFET transistor disabled by charger controller 118 to prevent power flow from power stage first side 122 to load 114 when bypass module is disabled. Alternatively, isolation module 142 may allow power from power stage second side 124 to load 114 when isolation module 142 is enabled in various modes. In this manner, load 114 may be connected through bypass module 140 to battery charger input 110. Charger controller 118 may drive a BYPSG signal and turn on bypass module 140 to connect (or, alternatively to disconnect) power adapter 106 from battery charger 104 and battery module 134. When charger controller 118 enables BYPSG, bypass module 140 is enabled to provide a higher efficiency path through battery charger 104 from battery charger input 110 to battery charger output 112. At the same time, battery module 134 may be isolated from battery charger output 112 by not driving a BGATE signal and turning off isolation module 142. When driving BYPSG, charger controller 118 may ensure that a BYPSRC is held at an enable voltage greater than 2.7V, in one example.

Charger controller 118 may include a loop control block 152 configured to control the operation of charger controller 104 and battery charger 104 including various modes (e.g., including forward continuous conduction mode, reverse continuous conduction mode, and forced continuous conduction mode), a pulse width modulation control block 154 configured to drive switching elements (Q1, Q2, Q3, and Q4) to operate power stage 120, and status and control block 156 configured to receive instructions from and provide status to a host computer 180 over bus 188. Control block 156 may include a plurality of control and status registers to store instructions and retain status for communication with host computer 180. For example, control block 156 may include a register for holding a value representing power adapter current limit 108 and other configuration settings.

Through pulse width modulation control block 154, charger controller 118 may provide control signals to each of the switching elements (Q1, Q2, Q3, and Q4) to operate power stage 120. In particular, charger controller 118 may provide a first gate control signal (UGATE1) to drive switching element Q1, a second gate control signal (LGATE1) to drive switching element Q2, a third gate control signal (LGATE2) to drive switching element Q3, and a fourth gate control signal (UGATE2) to drive switching element Q4.

As described above, system 100 may include an input current sensor 132 configured to detect load current 116. Input current sensor 132 may include a resistor network R1 of known value resistors that may connect to charger controller 118 between a positive input current sense signal (CSIP) and a negative input current sense signal (CSIN) to measure input current flowing from power adapter 106 to battery charger 104 based on load 114 load current 116. In one example, center resistor marked R1 may be paired with other resistors of equal value different from R1. In another example, each of the resistors in resistor network R1 has the same value corresponding to R1. Other resistor values and arrangements are possible. In this manner, the values of resistor network R1 may set a value of power adapter current limit 108. Alternatively, power adapter current limit 108 may be set by a programmable register value and load current 116 may be detected based on the positive input current sense signal (CSIP) and negative input current sense signal (CSIN). Charger controller 118 compares the measured input current by input current sensor 132 to power adapter current limit 108 to determine when supplemental power from battery module 134 may be needed for load 114 based on load current 116.

System 100 may include a battery current sensor 136 configured to detect current (I_b) provided to battery module 134 during charging of battery module 134 and configured to detect current provided by battery module 134 to load 114 during discharging of battery module 134. A resistor network R2 of known value resistors that may connect to charger controller 118 between a positive output current sense signal (CSOP) and a negative output current sense signal (CSON) to measure current flowing into and out of battery module 134 during charging and to measure current flowing out from battery module 134 during discharging, respectively. In one example, each of the resistors in resistor network R2 has the same value corresponding to R2. Other resistor values and arrangements are possible.

Power from power adapter 106 flows into battery charger 104 along a first power path 170 through battery charger input 110 at a certain voltage (V_adp) and current (I_adp) and through input current sensor 132 to a node 150. While load current 116 is less than or equal to power adapter current limit 108, battery charger 104 may provide a first portion of power from power adapter 106 along a second power path 172 to load 114 through battery charger output 112 at a certain voltage (V_load) and current (I_load). While load current 116 is less than or equal to power adapter current limit 108, battery charger 104 may be in a standby mode. Battery charger 104 may be in a standby mode when battery module 134 is fully charged and when neither charging battery module 134 in a forward mode (e.g., forward direction 128) nor providing power from battery module 134 to load 114 in a reverse mode (e.g., reverse direction 130), or battery charger 104 may be charging battery module 134 in forward direction 128 with at least a portion of power provided by power adapter 106 that is greater than power adapter current limit 108 along a third power path 174 through power stage 120 to battery module 134. However, while load current 116 is greater than power adapter current limit 108, battery charger 104 may be discharging battery module 134 in reverse direction 130 (e.g., a reverse turbo mode) providing power from battery module 134 along a fourth power path 176 through power stage 120 in reverse direction 130 to node 150 where power from fourth power path 176 combines with power on second power path 172 to provide sufficient power to meet an increased current demand from load 114 based on load current 116. As used herein, the terms power and current are closely related and may be used somewhat interchangeably.

System 100 may also include a host computer 180 such as a microcontroller or microcomputer having a processor 182 configured to read and execute computer instructions 184 (e.g., computer implemented code) stored on a non-transitory computer-readable medium 186 a read-only memory (ROM), a random access memory (RAM), a programmable logic device (PLD), a flash drive, a memory card/stick, a solid-state storage device, or the like which may be re-writable, removable, or replaceable to facilitate revision and/or update of computer instructions 184. Host computer 180 may exchange information with and perform configuration of battery charger 104 by sending and/or receiving information over a control and status bus 188 to charger controller 118. System 100 may also be described as related to an apparatus or device 102 that includes one or more elements, modules, and/or submodules of system 100.

Figure 2:
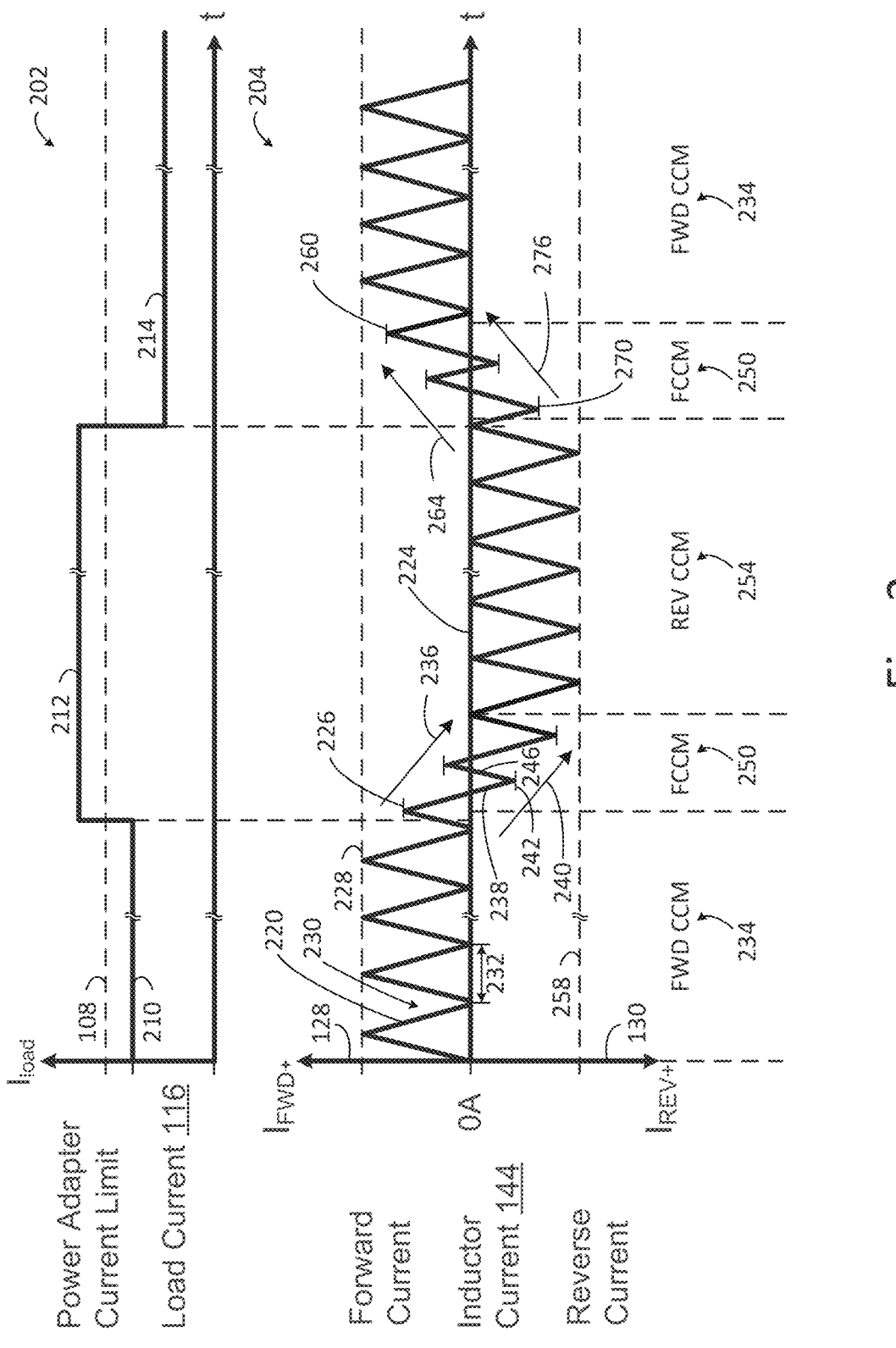
FIG. 2 illustrates representative waveforms during operation of a battery charger in continuous transition between a forward continuous conduction mode and a reverse continuous conduction mode through a forced continuous conduction mode, in accordance with various examples of the present disclosure.

FIG. 2 illustrates representative waveforms during operation of a battery charger in continuous transition between a forward continuous conduction mode and a reverse continuous conduction mode through a forced continuous conduction mode, in accordance with various examples of the present disclosure. FIG. 2 illustrates a load current waveform 202 illustrating a representative load current 116 ($I_{load}$). FIG. 2 also illustrates an inductor current waveform 204 illustrating a representative inductor current 144 ($I_L$) comprising a first periodic current 220 in a forward direction 128 and a second periodic current 238 in a reverse direction 130, opposite forward direction 128. As used herein, the phrase periodic current signal connotes a repeating current pattern of various magnitudes, where each periodic signal repeats as a cycle based on a signal frequency. A forward current ($I_{FWD+}$) is positive in an upward direction in FIG. 2 and rightward direction (forward direction 128) in FIG. 1, while a reverse current ($I_{REV+}$) is positive in a downward direction in FIG. 2 and leftward direction (reverse direction 130) in FIG. 1, as illustrated.

In reference to FIG. 1 and FIG. 2, charger controller 118 may be configured to control the first pair of switching elements (Q1, Q2) and the second pair of switching elements to alternately generate a first periodic current 220 in a forward direction 128 through inductor 126 to charge battery module 134 and generate a second periodic current 238 in reverse direction 130 through inductor 126 to supplement power from power adapter 106 to load 114 with power stored in battery module 134 when load current 116 is greater than power adapter current limit 108. As used herein, controlling the switching elements to alternately generate first periodic current 220 and second periodic current 238 includes generating the first periodic current 220 and second periodic current 238 in opposite directions through inductor 126 where the opposite currents are separated in time to avoid conflicts so that the inductor current may be changed continuously from forward direction 128 to reverse direction 130 and back again to forward direction 128. Stated differently, the prior need for entering a discontinuous mode, where no current is flowing through inductor 126 during a latency period, is eliminated.

According to an example, electronic system 100 may include power adapter 106 configured to provide electrical power. Power adapter 106 may have a power adapter current limit 108. System 100 may include a load 114 configured to consume electrical power. Load may have a load current 116. System 100 may include an input current sensor 132 configured to detect load current 116. System 100 may include a battery module 134 configured to store and retrieve electrical power in one or more battery cells 138. System 100 may also include a battery charger 104 including a charger controller 118 coupled to a power stage 120 having a power stage first side 122 and a power stage second side 124. Power stage first side 122 may include a first pair of switching elements (Q1, Q2) connected in a series arrangement and coupled to power adapter 106 through input current sensor 132 and through a battery charger input 110. Power stage second side 124 may include a second pair of switching elements (Q3, Q4) connected together in a series arrangement and coupled to battery module 134. First pair of switching elements (Q1, Q2) and second pair of switching elements (Q3, Q4) may be coupled together through an inductor 126 in a buck-boost converter arrangement. Load 114 may be connected through a battery charger output 112 to power stage first side 122 and isolated from power stage second side 124. Charger controller 118 may be configured to control first pair of switching elements (Q1, Q2) and second pair of switching elements (Q3, Q4) to alternately generate an inductor current 144 comprising a first periodic current 220 in a forward direction 128 through inductor 126 to charge the battery module and generate a second periodic current 238 in a reverse direction 130 through inductor 126 to supplement power from power adapter 106 to load 114 with power stored in battery module 134 when load current 116 is greater than power adapter current limit 108. Inductor current 144 may be changed from forward direction 128 to reverse direction 130 continuously.

According to this example, system 100 may include power adapter 106 that may be one of an AC/DC wall adapter and a USB port (e.g., a USB-C port, for example). System 100 may further include a bypass module 140 where load 114 may be connected through bypass module 140 to power stage first side 122. System 100 may further include an isolation module 142, where load 114 may be isolated from power stage second side 124 by isolation module 142. System 100 may further include a battery current sensor 136, the battery module may be connected through battery current sensor 136 to power stage second side 124. Charger controller 118 may be configured to continuously transition inductor current 144 from at least one of a forward continuous conduction mode 234 to a reverse continuous conduction mode 254 and the reverse continuous conduction mode 254 to forward continuous conduction mode 234 by entering a forced continuous conduction mode 250 during each continuous transition.

According to another example, an electronic apparatus 102 may include an input current sensor 132 configured to detect a load current 116 from a load 114 configured to consume electrical power, input current sensor 132 may be configured to receive power from a power adapter 106 having a power adapter current limit 108. Apparatus 102 may include a battery module 134 configured to store and retrieve electrical power in one or more battery cells 138. Apparatus 102 may include a battery charger 104 including a charger controller 118 coupled to a power stage 120 having a power stage first side 122 and a power stage second side 124. The power stage first side may include a first pair of switching elements (Q1, Q2) connected in a series arrangement and coupled to the power adapter through the input current sensor and through a battery charger input 110. The power stage second side 124 may include a second pair of switching elements (Q3, Q4) connected together in a series arrangement and coupled to battery module 134. The first pair of switching elements and the second pair of switching elements may be coupled together through an inductor 126 in a buck-boost converter arrangement. Load 114 may be connected through a battery charger output 112 to power stage first side 122 and isolated from power stage second side 124. Charger controller 118 may be configured to control the first pair of switching elements and the second pair of switching elements to alternately generate an inductor current 144 comprising a first periodic current 220 in a forward direction 128 through inductor 126 to charge battery module 134 and generate a second periodic current 238 in a reverse direction 130 through inductor 126 to supplement power from power adapter 106 to load 114 with power stored in battery module 134 when load current 116 is greater than power adapter current limit 108, the inductor current 144 being changed from forward direction 128 to reverse direction 130 continuously.

According to this example, apparatus 102 may include a bypass module 140, where load 114 may be connected through bypass module 140 to power stage first side 122. Apparatus 102 may include an isolation module 142, where load 114 may be isolated from power stage second side 124 by isolation module 142. Apparatus 102 may include a battery current sensor 136, where battery module 134 may be connected through battery current sensor 136 to power stage second side 124. Charger controller 118 may be configured to continuously transition inductor current 144 from at least one of a forward continuous conduction mode 234 to a reverse continuous conduction mode 254 and reverse continuous conduction mode 254 to forward continuous conduction mode 234 by entering a forced continuous conduction mode 250 during each continuous transition.

FIG. 3A and FIG. 3B are a flow diagram illustrating a method for operating a battery charger, in accordance with various examples. A method 300 (e.g., a process 300) may be implemented on hardware such as electronic system 100 or electronic apparatus 102 described in reference to FIG. 1 and FIG. 2. An example process may include one or more operations, actions, or functions as illustrated by one or more of blocks 302-336, as shown in FIG. 3A and FIG. 3B. Although illustrated as discrete blocks, various blocks may be divided into additional blocks, combined into fewer blocks, eliminated, performed in a different order, or performed in parallel, when not prohibited, depending on the desired implementation.

In reference to FIG. 1 through FIG. 3B, according to an example, a method 300 of operating a battery charger 104 may begin with a step 302 of receiving power from a power adapter 106 having a power adapter current limit 108 and connected to a battery charger input 110. Battery charger 104 may include a power stage 120 having a power stage first side 122 connected to battery charger input 110 through an input current sensor 132. Power stage first side 122 may be connected to a battery charger output 112 and may be configured to be connected to a load 114. Power stage 120 may have a power stage second side 124 configured to be connected to a battery module 134. Power stage second side 124 may be isolated from battery charger output 112. Power stage 120 may have an inductor 126 connected between power stage first side 122 and power stage second side 124. A battery charger configuration where battery charger output 112 is connected to battery charger input 110 and battery charger output 112 is isolated from power stage second side 124 may be identified as a Hybrid Power Buck Boost (HPBB) configuration.

Method 300 may continue with a step 304 of providing power from the power adapter to load 114 having a load current 116 at a first load current level 210 that is less than or equal to power adapter current limit 108. In this manner, power adapter 106 may provide sufficient power to satisfy load 114 having load current 116 within the capability of power adapter 106, and supplemental power from battery module 134 is not needed. In one example, first load current level 210 may be 4 A while power adapter current limit 108 may be 5 A.

Method 300 may continue with a step 306 of generating, by charger controller 118, a first periodic current 220 through inductor 126 in a forward direction 128 from power stage first side 122 to power stage second side 124 to provide power to battery module 134. In this manner, battery charger 104 is charging battery module 134, and battery charger 104 is not in standby mode. First periodic current 220 may be configured to increase from a zero current level 224 to a forward current level 226 and subsequently decrease to zero current level 224 in a triangular waveform 230. When forward current level 226 is equal to a forward current limit 228, battery charger 104 may be operating in a forward continuous conduction mode 234 (FWD CCM).

Method 300 may continue with a step 308 of detecting, by input current sensor 132, load 114 having load current 116 at a second load current level 212 that is greater than power adapter current limit 108. In one example, second load current level 212 may be 6 A while power adapter current limit 108 may be 5 A. In this manner, power adapter 106 is unable to provide sufficient power to satisfy load 114 having load current 116 at second load current level 212, and supplemental power from battery module 134 is needed to satisfy load 114. Power demand from load 114 may be a trigger for changing an operational mode such as changing from forward continuous conduction mode 234 to reverse continuous conduction mode 254 through forced continuous conduction mode 250, as herein described. This increase in current demand may typically occur as a transient. For example, when load 114 is a CPU (central processing unit/computer), a burst of high current draw by the CPU may not last long. Responding quickly to a transient increase in power demand may improve CPU system performance.

Method 300 may continue with a step 310 of decreasing, by charger controller 118, forward current level 226 of first periodic current 220. Method 300 may continue with a step 312 of generating, by charger controller 118, a second periodic current 238 through the inductor in a reverse direction 130 from power stage second side 124 to power stage first side 122 to provide power from battery module 134 to power stage first side 122 and to load 114. Second periodic current 238 may be configured to increase from zero current level 224 to a reverse current level 242 and subsequently decrease to zero current level 224 in a triangular waveform 246 (e.g., or mountain waveform). Second periodic current 238 may be initiated in reverse direction 130 when first periodic current 220 in forward direction 128 reaches zero current level 224. Within the limits of loop control 152, waiting for first periodic current 220 in forward direction 128 to return to zero current level 224 before initiating second periodic current 238 in reverse direction 130 may prevent current conflicts across (e.g., through) inductor 126. In this manner, the instantaneous transition from forward direction 128 to reverse direction 130 indicates battery charger 104 may be operated in a forced continuous conduction mode 250 where the inductor current may be changed from forward direction 128 to reverse direction 130 continuously. As illustrated, forward current level 226 progressively decreases 236 while reverse current level 242 progressively increases 240 during the transition from forward continuous conduction mode 234 through forced continuous conduction mode 250 and into reverse continuous conduction mode 254.

Method 300 may continue with a step 314, wherein an increase in first periodic current 220 from zero current level 224 to forward current level 226 and a subsequent decrease in first periodic current 220 to zero current level 224 correspond to one cycle 232 of first periodic current 220, and wherein decreasing forward current level 226 of first periodic current 220 occurs over a plurality of cycles 236 of first periodic current 220.

Method 300 may continue, while the forward current limit is greater than the zero current level and subsequent to generating the second periodic current, with a step 316 of generating, by charger controller 118, first periodic current 220 through inductor 126 in forward direction 128 from power stage first side 122 to power stage second side 124 to provide power to battery module 134. First periodic current 220 may be configured to increase from zero current level 224 to forward current level 226 and subsequently decrease to zero current level 224. First periodic current 220 may be initiated in forward direction 128 when (e.g., after) second periodic current 238 reaches zero current level 224. In this manner, battery charger 104 continues to charge battery module 134 during transition from forward continuous conduction mode 234 to a reverse continuous conduction move 254 through forced continuous conduction mode 250.

Method 300 may continue with a step 318 of decreasing forward current level 226 to zero current level 224. Once forward current level 226 reaches zero current level 224, first periodic current 220 in forward direction 128 through inductor 126 ceases, and forced continuous conduction mode 250 also ceases.

Method 300 may continue with a step 320 of increasing reverse current level 242 to a reverse current limit 258. In this manner, second periodic current 238 increased in reverse direction 130. Method 300 may continue in a step 322, wherein forward current limit 228 is substantially equal to reverse current limit 258. In this manner, the amount of current (e.g., power) provided to charge battery module 134 in forward direction 128 may be substantially equal to the amount of current provided by battery module 134 to load 114 in reverse direction 130. As used herein, substantially equal means the current values are within 10% of each other, for example.

Method 300 may continue from step 320 with a step 324, wherein when forward current level 226 is zero current level 224 and reverse current level 242 is reverse current limit 258, the battery charger may then be operated in a reverse continuous conduction mode 254. In this manner, forced continuous conduction mode 250 has ceased and reverse continuous conduction mode 254 has begun.

Method 300 may continue from step 324 with a step 326 of detecting, by input current sensor 132, load 114 may have load current 116 at a third load current level 214 that is less than or equal to the adapter power current limit 108. In this manner, supplemental power from battery module 134 is no longer needed. In one example, third load current level 214 may be 3 A while power adapter current limit 108 may be 5 A.

Method 300 may continue with a step 328 of decreasing, by charger controller 118, reverse current level 270 of second periodic current 238. Method 300 may continue with a step 330 of increasing, by charger controller 118, forward current level 260 of first periodic current 220. Method 300 may continue with a step 332 of generating, by charger controller 118, first periodic current 220 through inductor 126 in forward direction 128 to provide power to battery module 134. First periodic current 220 may be initiated in forward direction 128 when second periodic current 238 in reverse direction 130 reaches zero current level 224. Battery charger 104 may begin operating in forced continuous conduction mode 250. Inductor current 126 may be changed from reverse direction 130 to forward direction 128 continuously.

Method 300 may continue in a step 334 of decreasing reverse current level 270 to zero current level 224. Method 300 may continue in a step 336 of increasing forward current level 260 to forward current limit 228. Battery charger 104 may then be operated in forward continuous conduction mode 234. As illustrated, reverse current level 270 progressively decreases 276 while forward current level 260 progressively increases 264 during the transition from reverse continuous conduction mode 254 through forced continuous conduction mode 250 and into forward continuous conduction mode 234. In this manner, the process of method 300 is intended to continue.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "including", "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The various embodiments were chosen and described in order to best explain the principles of the invention and the practical application, and to enable others of ordinary skill in the art to understand the invention for various embodiments with various modifications as are suited to the particular use contemplated.

What is claimed is:

1. A method of controlling a battery charger, the method comprising:

receiving power from a power adapter having a power adapter current limit and connected to a battery charger input, the battery charger including a power stage having a power stage first side connected to the battery charger input through an input current sensor, the power stage first side being connected to a battery charger output and configured to be connected to a load, the power stage having a power stage second side configured to be connected to a battery module, the power stage second side being isolated from the battery charger output, the power stage having an inductor connected between the power stage first side and the power stage second side;

providing power from the power adapter to the load having a load current at a first load current level that is less than or equal to the power adapter current limit;

generating, by a charger controller, a first periodic current through the inductor in a forward direction from the power stage first side to the power stage second side to provide power to the battery module, the first periodic current configured to increase from a zero current level to a forward current level being a forward current limit and subsequently decrease to the zero current level in a triangular waveform, the battery charger being operated in a forward continuous conduction mode;

detecting, by the input current sensor, the load having the load current at a second load current level that is greater than the adapter power current limit;

decreasing, by the charger controller, the forward current level of the first periodic current; and generating, by the charger controller, a second periodic current through the inductor in a reverse direction from the power stage second side to the power stage first side to provide power from the battery module to the power stage first side, the second periodic current configured to increase from the zero current level to a reverse current level and subsequently decrease to zero current level in a triangular waveform, the second periodic current being initiated in the reverse direction when the first periodic current in the forward direction reaches the zero current level, the battery charger being operated in a forced continuous conduction mode, the inductor current being changed from the forward direction to the reverse direction continuously.

2. The method of claim 1, wherein an increase in the first periodic current from the zero current level to the forward current level and a subsequent decrease in the first periodic current to the zero current level correspond to one cycle of the first periodic current, and wherein decreasing the forward current level of the first periodic current occurs over a plurality of cycles of the first periodic current.

3. The method of claim 2, while the forward current limit is greater than the zero current level and subsequent to generating the second periodic current, the method further comprises:

generating, by the charger controller, the first periodic current through the inductor in the forward direction from the power stage first side to the power stage second side to provide power to the battery module, the first periodic current configured to increase from the zero current level to the forward current level and subsequently decrease to the zero current level, the first periodic current being initiated in the forward direction when the second periodic current reaches the zero current level.

4. The method of claim 3, further comprising:
decreasing the forward current level to the zero current level.

5. The method of claim 4, further comprising:
increasing the reverse current level to a reverse current limit.

6. The method of claim 5, wherein the forward current limit is substantially equal to the reverse current limit.

7. The method of claim 5,
wherein when the forward current level is the zero current level and the reverse current level is the reverse current limit, the battery charger being operated in a reverse continuous conduction mode.

8. The method of claim 7, further comprising:
detecting, by the input current sensor, the load having the load current at a third load current level that is less than or equal to the power adapter current limit;
decreasing, by the charger controller, the reverse current level of the second periodic current;
increasing, by the charger controller, the forward current level of the first periodic current; and
generating, by the charger controller, the first periodic current through the inductor in the forward direction to provide power to the battery module, the first periodic current being initiated in the forward direction when the second periodic current in the reverse direction reaches the zero current level, the battery charger being operated in the forced continuous conduction mode, the inductor current being changed from the reverse direction to the forward direction continuously.

9. The method of claim 8, further comprising:
decreasing the reverse current level to the zero current level; and
increasing the forward current level to the forward current limit, the battery charger being operated in the forward continuous conduction mode.

10. An electronic apparatus, comprising:
an input current sensor configured to detect a load current from a load configured to consume electrical power, the input current sensor configured to receive power from a power adapter having a power adapter current limit;
a battery module configured to store and retrieve electrical power in one or more battery cells; and
a battery charger comprising a charger controller coupled to a power stage having a power stage first side and a power stage second side, the power stage first side comprising a first pair of switching elements connected in a series arrangement and coupled to the power adapter through the input current sensor and through a battery charger input, the power stage second side comprising a second pair of switching elements connected together in a series arrangement and coupled to the battery module, the first pair of switching elements and the second pair of switching elements being coupled together through an inductor in a buck-boost converter arrangement, the load being connected through a battery charger output to the power stage first side and isolated from the power stage second side,
wherein the charger controller is configured to control the first pair of switching elements and the second pair of switching elements to alternately generate an inductor current comprising a first periodic current in a forward direction through the inductor to charge the battery module and generate a second periodic current in a reverse direction through the inductor to supplement power from the power adapter to the load with power stored in the battery module when the load current is greater than the power adapter current limit, the inductor current being changed from the forward direction to the reverse direction continuously.

11. The apparatus of claim 10, further comprising a bypass module, the load being connected through the bypass module to the power stage first side.

12. The apparatus of claim 10, further comprising an isolation module, the load being isolated from the power stage second side by the isolation module.

13. The apparatus of claim 10, further comprising a battery current sensor, the battery module being connected through the battery current sensor to the power stage second side.

14. The apparatus of claim 10, wherein the charger controller is configured to continuously transition the inductor current from at least one of a forward continuous conduction mode to a reverse continuous conduction mode and the reverse continuous conduction mode to the forward continuous conduction mode by entering a forced continuous conduction mode.

15. An electronic system, comprising:
a power adapter configured to provide electrical power, the power adapter having a power adapter current limit;
a load configured to consume electrical power, the load having a load current;
an input current sensor configured to detect the load current;
a battery module configured to store and retrieve electrical power in one or more battery cells; and
a battery charger comprising a charger controller coupled to a power stage having a power stage first side and a power stage second side, the power stage first side comprising a first pair of switching elements connected in a series arrangement and coupled to the power adapter through the input current sensor and through a battery charger input, the power stage second side comprising a second pair of switching elements connected together in a series arrangement and coupled to the battery module, the first pair of switching elements and the second pair of switching elements being coupled together through an inductor in a buck-boost converter arrangement, the load being connected through a battery charger output to the power stage first side and isolated from the power stage second side,
wherein the charger controller is configured to control the first pair of switching elements and the second pair of switching elements to alternately generate an inductor current comprising a first periodic current in a forward direction through the inductor to charge the battery module and generate a second periodic current in a reverse direction through the inductor to supplement power from the power adapter to the load with power stored in the battery module when the load current is greater than the power adapter current limit, the inductor current being changed from the forward direction to the reverse direction continuously.

16. The system of claim 15, wherein the power adapter is one of an AC/DC wall adapter and a USB port.

17. The system of claim 15, further comprising a bypass module, the load being connected through the bypass module to the power stage first side.

18. The system of claim 15, further comprising an isolation module, the load being isolated from the power stage second side by the isolation module.

19. The system of claim 15, further comprising a battery current sensor, the battery module being connected through the battery current sensor to the power stage second side.

20. The system of claim 15, wherein the charger controller is configured to continuously transition the inductor current from at least one of a forward continuous conduction mode to a reverse continuous conduction mode and the reverse continuous conduction mode to the forward continuous conduction mode by entering a forced continuous conduction mode.

\* \* \* \* \*